(12) United States Patent
Liao et al.

(10) Patent No.: US 8,889,789 B2
(45) Date of Patent: Nov. 18, 2014

(54) LOW DIELECTRIC CONSTANT RESIN FORMULATION, PREPOLYMER, COMPOSITION, AND COMPOSITE THEREOF

(75) Inventors: Lu-Shih Liao, Taichung (TW); Kuo-Chan Chiou, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 85 days.

(21) Appl. No.: 13/458,583

(22) Filed: Apr. 27, 2012

(65) Prior Publication Data
US 2013/0101858 A1  Apr. 25, 2013

(30) Foreign Application Priority Data
Oct. 21, 2011 (TW) .............................. 100138225 A

(51) Int. Cl.
  C08L 71/02    (2006.01)
  C07C 265/12   (2006.01)
  C07D 207/40   (2006.01)

(52) U.S. Cl.
  USPC ............................ 524/726; 548/545; 560/358

(58) Field of Classification Search
  USPC ............................ 524/726; 548/545; 560/358
  See application file for complete search history.

(56) References Cited

U.S. PATENT DOCUMENTS

| | | | | |
|---|---|---|---|---|
| 3,375,298 A * | 3/1968 | Fox | .................. | 525/395 |
| 3,703,564 A * | 11/1972 | White | .................. | 525/397 |
| 4,689,372 A * | 8/1987 | Han et al. | .................. | 525/390 |
| 5,026,764 A * | 6/1991 | Okabe et al. | .................. | 524/540 |
| 5,635,570 A * | 6/1997 | Abe et al. | .................. | 525/391 |
| 7,879,968 B2 | 2/2011 | Kim et al. | | |
| 2003/0144430 A1 | 7/2003 | Liu et al. | | |
| 2005/0014875 A1 | 1/2005 | Knop et al. | | |
| 2005/0181215 A1 | 8/2005 | Suzuki et al. | | |
| 2005/0239975 A1 | 10/2005 | Gan et al. | | |
| 2006/0084787 A1 | 4/2006 | Sugano et al. | | |
| 2008/0262139 A1 | 10/2008 | Wu et al. | | |
| 2009/0192273 A1 | 7/2009 | Ichinose et al. | | |
| 2010/0044086 A1 | 2/2010 | Takai et al. | | |

FOREIGN PATENT DOCUMENTS

| | | |
|---|---|---|
| EP | 1 630 199 A1 | 3/2006 |
| EP | 1 377 638 B1 | 8/2007 |
| EP | 1 967 538 A1 | 9/2008 |
| JP | 2003-138241 A | 5/2003 |
| JP | 2004-217861 A | 8/2004 |
| TW | 200530326 | 9/2005 |
| TW | 200823243 | 6/2008 |
| WO | WO 03/048251 A1 | 6/2003 |

OTHER PUBLICATIONS

Lee et al., "Development of Halogen-Free and Phosphorous-Free Dielectric Materials for Highly Thermal Conductivity Copper Clad Laminate", IMPACT 2008, pp. 624-627.
Liao et al., "The Technology and Applications of Environmentally-Friendly Dielectric Insulation Materials for Chip-in-Substrate Package", Advanced Microsystem and Packaging Quarterly Jul. 1, 2007, pp. 11-21.
Liao et al., "Thermal Conductive Dielectric Materials for High Power LED Substrate", Industrial Materials May 1, 2010, pp. 90-98.
Liao et al., "The Technology of Environmentally Low Dielectric Materials", Advanced Microsystem and Packaging Quarterly, Jan. 31, 2011, pp. 55-66.
Taiwan Office Action for Appl. No. 100138225 dated Aug. 20, 2013.
Chinese Office Action for Chinese Application No. 201110416454.3 dated Mar. 26, 2014.

\* cited by examiner

*Primary Examiner* — Thao T. Tran
(74) *Attorney, Agent, or Firm* — Birch, Stewart, Kolasch & Birch, LLP

(57) ABSTRACT

The present disclosure provides a low dielectric constant resin formulation comprising 20-150 parts by weight of diisocyanate, 20-400 parts by weight of poly(2,6-dialkyl-1,4-phenylene oxide), and 200-650 parts by weight of a solvent. The present disclosure also provides a low dielectric constant resin prepolymer, composition, and composite produced from the above formulation, and a method for preparing the low dielectric constant resin prepolymer solution.

15 Claims, No Drawings

LOW DIELECTRIC CONSTANT RESIN FORMULATION, PREPOLYMER, COMPOSITION, AND COMPOSITE THEREOF

CROSS REFERENCE TO RELATED APPLICATIONS

This application claims priority of Taiwan Patent Application No. 100138225, filed on Oct. 21, 2011, the entirety of which is incorporated by reference herein.

TECHNICAL FIELD

This technical field is related to a low dielectric constant resin formulation, prepolymer, composition, and composite thereof.

BACKGROUND

A phosphide is commonly chosen for a flame retardant to replace halogen compounds in a halogen-free composition. Moreover, in order to reduce the phosphor content, aluminum hydroxide is employed to meet the UL-94 V0 fire rating. Aluminum hydroxide is also employed in a halogen-free and phosphor-free composition to meet the UL-94 V0 fire rating.

As for the materials of organic substrate, except for bismaleimide triazine (BT) resin, epoxy-based fire retardant resins generally have a Tg of about 180° C. measured by a thermal mechanical analyzer (TMA). Therefore, to improve the flame retardancy, flame-retardant inorganic powders or resins are additionally incorporated.

Accordingly, what is needed in the art is an eco-friendly resin with high thermal-resistance and low-dielectric-constant for advances in high-frequency devices.

SUMMARY

The present disclosure provides a low dielectric constant resin formulation, comprising: 20-150 parts by weight of diisocyanate; 20-400 parts by weight of poly(2,6-dialkyl-1,4-phenylene oxide); and 200-650 parts by weight of a solvent.

The present disclosure also provides a low dielectric constant resin prepolymer, having Formula I or having repeating units of Formula II and Formula III below:

wherein A is phenyl or cyclohexyl;
X is —H, —CH$_3$, —NCO, or —CH$_2$—NCO;
Y is —NH—, —NHCO—, or —NHCOO—;
Q is —CH2-, —C(CH$_3$)$_2$—, —O—, —S—, —SO$_2$—, or absent;
n is an integer of 20-230;
R$_3$ is —H, —CH$_3$, or —COOH;
R$_1$ and R$_2$, independently, are C$_1$-C$_5$ alkyl;
m is an integer of 0-8;
y is an integer of 20-230;
z is an integer of 1-20000; and
V is —NH—, —NHCO—, or —NHCOO—.

The present disclosure further provides a low dielectric constant resin composition, formed by steps comprising: mixing 20-150 parts by weight of diisocyanate, 20-400 parts by weight of poly(2,6-dialkyl-1,4-phenylene oxide), and 200-650 parts by weight of a solvent to form a low dielectric constant resin formulation; heating the low dielectric constant resin formulation to perform a prepolymerization reaction to form a low dielectric constant resin prepolymer solution; and heating the low dielectric constant resin prepolymer solution to obtain the above described low dielectric constant composition.

The present disclosure further provides a low dielectric constant resin composite, comprising: a substrate; and the above described low dielectric constant resin composition.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In an embodiment, the low dielectric constant resin formulation is generally composed of diisocyanate, poly(2,6-dialkyl-1,4-phenylene oxide), and a solvent. Optionally, the low dielectric constant resin formulation may further comprise a carboxy anhydride derivative. The low dielectric constant resin formulation produced by the reaction with the

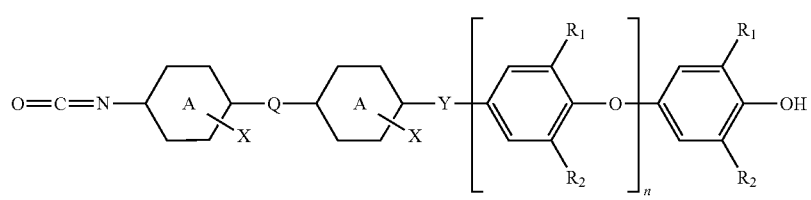

I

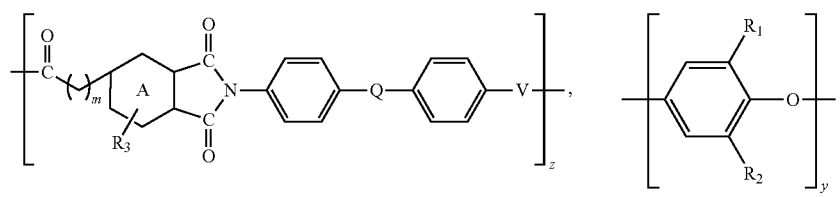

II  III above components is eco-friendly and has a high thermal resistance that meets the UL-94 V0 fire rating without the addition of a flame retardant, thereby advancing in high-frequency devices.

The low dielectric constant resin formulation comprises 20-150 parts by weight, such as 30-120 parts by weight of diisocyanate; 20-400 parts by weight, such as 50-300 parts by weight of poly(2,6-dialkyl-1,4-phenylene oxide); and 200-650 parts by weight, such as 350-600 parts by weight of a solvent.

In an embodiment, the diisocyanate in the low dielectric constant resin formulation includes, but is not limited to, methylene diphenyl diisocyanate (MDI), toluene diisocyanate (TDI), isophorone diisocyanate (IPDI), hexamethylene diisocyanate, or combinations thereof.

In an embodiment, the solvent in the low dielectric constant resin formulation may be selected in accordance with the diisocyanate and poly(2,6-dialkyl-1,4-phenylene oxide) used, which includes, but are not limited to, toluene, xylene, dimethyl formamide (DMF), N-methyl-2-pyrrolidone (NMP), dimethyl sulfoxide (DMSO), or combinations thereof.

In an embodiment, a low dielectric constant resin prepolymer formed by diisocyanate and poly(2,6-dialkyl-1,4-phenylene oxide) has Formula I below:

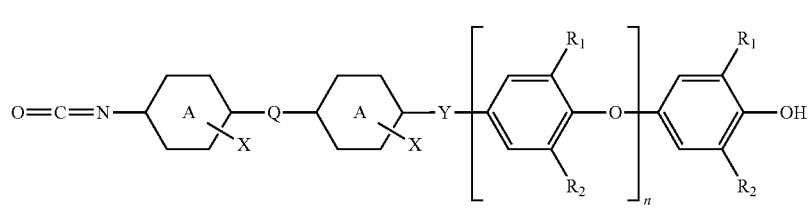

wherein A is phenyl or cyclohexyl; X is —H, —CH$_3$, —NCO, or —CH$_2$—NCO; Y is —NH—, —NHCO—, or —NHCOO—; R$_1$ and R$_2$, independently, are C$_1$-C$_5$ alkyl; Q is —CH$_2$—, —C(CH$_3$)$_2$—, —O—, —S—, —SO$_2$—, or absent; and n is an integer of 20-230. The low dielectric constant resin prepolymer can be heat cured to obtain the low dielectric constant resin composition.

In an embodiment, the prepolymerization reaction of diisocyanate and poly(2,6-dialkyl-1,4-phenylene oxide) is performed at a temperature of about 80° C. to 140° C., such as about 110° C. to 130° C., for about 0.5-5 hours, such as 1-3 hours.

In an embodiment, the low dielectric constant resin prepolymer solution of the present disclosure may further comprise 6-100 parts by weight, such as 10-85 parts by weight of a carboxy anhydride derivative to perform a co-polymerization reaction. The carboxy anhydride derivative may be a tri-functional derivative, and may have a formula IV below:

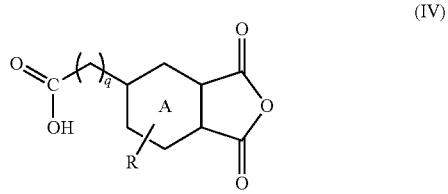

(IV)

wherein A is phenyl or cyclohexyl; R is —H, —CH$_3$, or —COOH; and q is an integer of 0-8. Exemplary tri-functional carboxyl anhydride derivatives include trimellitic anhydride (TMA), cyclohexane-1,2,4-tricarboxylic acid-1,2-anhydride (c-TMA), or combinations thereof.

In an embodiment, the prepolymerization reaction with diisocyanate, poly(2,6-dialkyl-1,4-phenylene oxide), and carboxy anhydride derivative is performed at a temperature of about 80° C. to 140° C., such as about 110° C. to 130° C., for about 0.5-6 hours, such as 1-3.5 hours.

In an embodiment, a low dielectric constant resin prepolymer formed by diisocyanate, poly(2,6-dialkyl-1,4-phenylene oxide), and carboxy anhydride derivative has repeating units of Formula II and Formula III below:

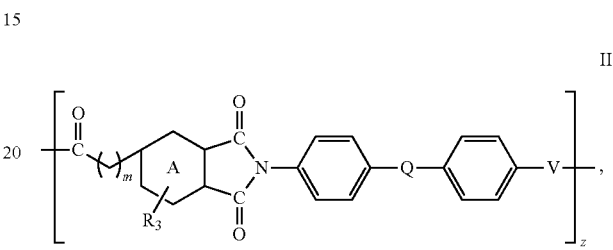

-continued

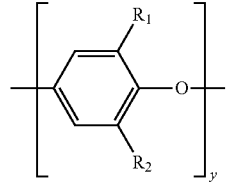

III wherein A is phenyl or cyclohexyl; R$_3$ is —H, —CH$_3$, or —COOH; R1 and R$_2$, independently, are C$_1$-C$_5$ alkyl; Q is —CH$_2$—, —C(CH$_3$)$_2$—, —O—, —S—, —SO$_2$—, or absent; m is an integer of 0-8; y is an integer of 20-230; z is an integer of 1-20000 or 10-1500; and V is —NH—, —NHCO—, or —NHCOO—. In one embodiment, low dielectric constant prepolymer can be heat cured (for example, 175-225° C. for a period of 1-4.5 hours) to obtain the low dielectric constant composition.

The low dielectric constant resin prepolymer solution of the present disclosure may be employed in various kinds of applications depending on practical requirements. In an embodiment, a low dielectric constant resin composition may be formed from the low dielectric constant resin prepolymer solution by a method comprising: coating the low dielectric constant resin prepolymer solution to metal foils, such as copper foils followed by a heating and pressing process at a temperature of approximately 175-225° C., such as 185-215°

C. for a period of 1-4.5 hours, such as 1.5-3.5 hours to obtain a low dielectric constant resin composition for use in a high-frequency substrate.

In another embodiment, a low dielectric constant resin composite may be formed from the low dielectric constant resin prepolymer solution by a method comprising: impregnating a fiber in the low dielectric constant resin prepolymer solution, followed by a laminating process with heat pressing. In an embodiment, the fiber used in the low dielectric constant resin composition may comprise: glass fiber cloth or polyamide fiber. The heat curing process is performed at a temperature of approximately 175-225° C. or approximately 185-215° C., for about 1-4.5 hours or 1.5-3.5 hours to obtain a low dielectric constant resin composite.

The resin composite produced by the method of the present disclosure is halogen-free, phosphor-free, and has a dielectric constant (Dk) of about 3.0-4.0, such as about 3.2-3.9, as well as a glass transition temperature (Tg) higher than about 180° C., such as 180-230° C., and can meet the demand of UL-94 V0 fire rating without the addition of an inorganic flame-retardant powder, such as aluminum hydroxide.

The resin composite of the disclosure is eco-friendly and characterized by high thermal-resistance and low-dielectric-constant, and a Tg of above 180° C., and lost in signal transduction (due to the smaller dissipation factor (Df)) is less to advance in high-frequency materials. The resin composite is a green material with desirable chemical and physical properties that can be readily incorporated into various electronic devices to form a low dielectric constant composite with good mechanical properties.

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Example 1

100 g of MDI (methylene diphenyl isocyanate, Fu-Pao Chemical Co.), 100 g of PPO (Poly(2,6-dimethyl-1,4-phenylene oxide), Chang Chun Plastics Co.), 200 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 60 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 2

50 g of TMA (trimellitic anhydride, Fu-Pao Chemical Co.), 50 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 3

50 g of TMA (trimellitic anhydride, Fu-Pao Chemical Co.), 115.8 g of PPO (Poly(2,6-dimethyl-1,4-phenylene oxide), Chang Chun Plastics Co.), 41.9 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 4

50 g of TMA (trimellitic anhydride, Fu-Pao Chemical Co.), 115.8 g of PPO (Poly(2,6-dimethyl-1,4-phenylene oxide), Chang Chun Plastics Co.), 109.5 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 5

50 g of TMA (trimellitic anhydride, Fu-Pao Chemical Co.), 115.8 g of PPO (Poly(2,6-dimethyl-1,4-phenylene oxide), Chang Chun Plastics Co.), 68.7 g of IPDI (isophorone diisocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 6

50 g of TMA (trimellitic anhydride, Fu-Pao Chemical Co.), 57.9 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 7

50 g of TMA (trimellitic anhydride, Fu-Pao Chemical Co.), 270.1 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 8

53 g of c-TMA (Cyclohexane-1,2,4-tricarboxylic acid-1,2-anhydride, Fu-Pao Chemical Co.), 115.8 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 9

53 g of c-TMA (Cyclohexane-1,2,4-tricarboxylic acid-1,2-anhydride, Fu-Pao Chemical Co.), 115.8 g of PPO (Poly(2,6-dimethyl-1,4-phenylene oxide), Chang Chun Plastics Co.), 68.7 g of IPDI (isophorone diisocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 10

14.9 g of TMA (trimellitic anhydride, Fu-Pao Chemical Co.), 115.8 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Example 11

77 g of TMA (trimellitic anhydride, Fu-Pao Chemical Co.), 115.8 g of PPO (Poly(2,6-dimethyl-1,4-phenylene oxide), Chang Chun Plastics Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a low dielectric constant material.

Comparative Example 1

50 g of TMA (trimellitic anhydride, Fu-Pao Chemical Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a dielectric material.

Comparative Example 2

50 g of TMA (trimellitic anhydride, Fu-Pao Chemical Co.), 68.7 g of IPDI (isophorone diisocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a dielectric material.

Comparative Example 3

53 g of c-TMA (Cyclohexane-1,2,4-tricarboxylic acid-1,2-anhydride, Fu-Pao Chemical Co.), 65.8 g of MDI (methylene diphenyl isocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a dielectric material.

Comparative Example 4

53 g of c-TMA (Cyclohexane-1,2,4-tricarboxylic acid-1,2-anhydride, Fu-Pao Chemical Co.), 68.7 g of IPDI (isophorone diisocyanate, Fu-Pao Chemical Co.), 444.5 g of toluene (C-ECHO Co.), and 111.1 g of DMF (dimethylformamide, C-ECHO Co.) were added into a 500 ml three-inlet glass reactor having two agitating blades, and then stirred at a temperature of 125° C. for 180 minutes. After the reaction was completed, the temperature was cooled to room temperature to obtain a halogen-free and phosphor-free low dielectric formulation varnish. Then, a glass fiber was impregnated in the low dielectric constant resin formulation varnish, followed by a laminating process with heating and pressing at a temperature of 200° C. for 3 hours to obtain a dielectric material.

TABLE 1

The physical properties of the Examples and the Comparative Examples

|  | TMA (g) | c-TMA (g) | PPO (g) | MDI (g) | IPDI (g) | Dk @10 GHz | Df @10 GHz | Tg (° C.) | $Td_{5\%}$ (° C.) | UL-94 |
|---|---|---|---|---|---|---|---|---|---|---|
| Example 1 | X | X | 100 | 100 | X | 3.8 | 0.0098 | 182 | 346 | V0 |
| Example 2 | 50 | X | 115.8 | 65.8 | X | 3.2 | 0.0071 | 226 | 459 | V0 |
| Example 3 | 50 | X | 115.8 | 41.9 | X | 3.4 | 0.0072 | 204 | 428 | V0 |
| Example 4 | 50 | X | 115.8 | 109.5 | X | 3.8 | 0.0128 | 206 | 436 | V0 |
| Example 5 | 50 | X | 115.8 | X | 68.7 | 3.7 | 0.0098 | 209 | 423 | V0 |
| Example 6 | 50 | X | 57.9 | 65.8 | X | 3.9 | 0.0115 | 227 | 465 | V0 |
| Example 7 | 50 | X | 270.1 | 65.8 | X | 3.2 | 0.0064 | 182 | 397 | V0 |
| Example 8 | X | 53 | 115.8 | 65.8 | X | 3.4 | 0.0074 | 204 | 429 | V0 |
| Example 9 | X | 53 | 115.8 | X | 68.7 | 3.8 | 0.0128 | 201 | 436 | V0 |
| Example 10 | 14.9 | X | 115.8 | 65.8 | X | 3.7 | 0.0096 | 193 | 417 | V0 |
| Example 11 | 77 | X | 115.8 | 65.8 | X | 3.8 | 0.0117 | 208 | 424 | V0 |
| Comparative Example 1 | 50 | X | X | 65.8 | X | 4.8 | 0.0163 | 213 | 451 | V0 |
| Comparative Example 2 | 50 | X | X | X | 68.7 | 4.9 | 0.0187 | 196 | 435 | V0 |
| Comparative Example 3 | X | 53 | X | 65.8 | X | 4.7 | 0.0156 | 198 | 442 | V0 |
| Comparative Example 4 | X | 53 | X | X | 68.7 | 4.9 | 0.0196 | 181 | 416 | V1 |

TMA: trimellitic anhydride
c-TMA: cyclohexane-1,2,4-tricarboxylic acid-1,2-anhydride
PPO: Poly(2,6-dimethyl-1,4-phenylene oxide)
MDI: methylene diphenyl diisocyanate
IPDI: isophorone diisocyanate
Dk: dielectric constant
Df: dissipation factor
Tg: glass transition temperature
$Td_{5\%}$: 5% thermal decomposition temperature
X: not added Referring to Table 1, the Examples of the present disclosure shown an obvious improvement over the Comparative Examples. The resin composites of the Examples had a much lower dielectric constant than that of the Comparative Examples. In addition, the glass transition temperatures (Tg) of all Examples were higher than 180° C., and due to the smaller dissipation factor (Df), less signal transduction lost is expected to occur. Therefore, an eco-friendly, high thermal-resistant, low dielectric constant resin composite is disclosed to advance in high-frequency devices.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A low dielectric constant resin formulation, consisting essentially of:
   20-150 parts by weight of diisocyanate;
   20-400 parts by weight of poly(2,6-dialkyl-1,4-phenylene oxide);
   200-650 parts by weight of a solvent; and
   6-100 parts by weight of a carboxy anhydride derivative.

2. The low dielectric constant resin formulation of claim 1, wherein the diisocyanate comprises: methylene diphenyl diisocyanate (MDI), toluene diisocyanate (TDI), isophorone diisocyanate (IPDI), hexamethylene diisocyanate, or combinations thereof.

3. The low dielectric constant resin formulation of claim 1, wherein the solvent comprises: toluene, xylene, dimethyl formamide (DMF), N-methyl-2-pyrrolidone (NMP), dimethyl sulfoxide (DMSO), or combinations thereof.

4. The low dielectric constant resin formulation of claim 1, wherein the carboxy anhydride derivative has a formula below:

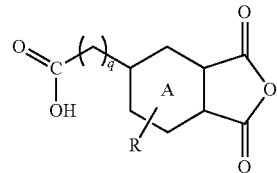

wherein A is phenyl or cyclohexyl;
R is —H, —CH$_3$, or —COOH; and
q is an integer of 0-8.

5. A low dielectric constant resin composition prepared by:
heating the low dielectric constant resin formulation as claimed in claim 1 to perform a prepolymerization reaction to form a low dielectric constant resin prepolymer solution; and
heating the low dielectric constant resin prepolymer solution to obtain the low dielectric constant composition.

6. The low dielectric constant resin composition as claimed in claim 5, wherein the diisocyanate comprises: methylene diphenyl diisocyanate (MDI), toluene diisocyanate (TDI), isophorone diisocyanate (IPDI), hexamethylene diisocyanate, or combinations thereof.

7. The low dielectric constant resin composition as claimed in claim 5, wherein the solvent comprises: toluene, xylene, dimethyl formamide (DMF), N-methyl-2-pyrrolidone (NMP), dimethyl sulfoxide (DMSO), or combinations thereof.

8. The low dielectric constant resin composition as claimed in claim 5, wherein the low dielectric constant resin formulation further comprises 6-100 parts by weight of a carboxy anhydride derivative.

9. The low dielectric constant resin composition as claimed in claim 8, wherein the carboxy anhydride derivative has a formula below:

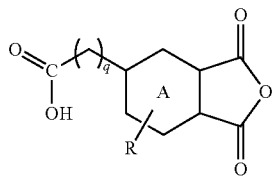

wherein A is phenyl or cyclohexyl;
R is —H, —CH$_3$, or —COOH; and
q is an integer of 0-8.

10. The low dielectric constant resin composition as claimed in claim 5, wherein the prepolymerization reaction is performed at a temperature of about 80° C. to 140° C.

11. A low dielectric constant resin composite, comprising:
a substrate; and
the low dielectric constant resin composition of claim 5.

12. The low dielectric constant resin composite of claim 11, wherein the substrate comprising a fiber.

13. The low dielectric constant resin composite of claim 12, wherein the fiber comprises a fibre glass cloth or a polyamide fiber.

14. The low dielectric constant resin composite of claim 11, wherein the substrate comprising a metal foil.

15. A low dielectric constant resin prepolymer, having Formula I or having repeating units of Formula II and Formula III below:

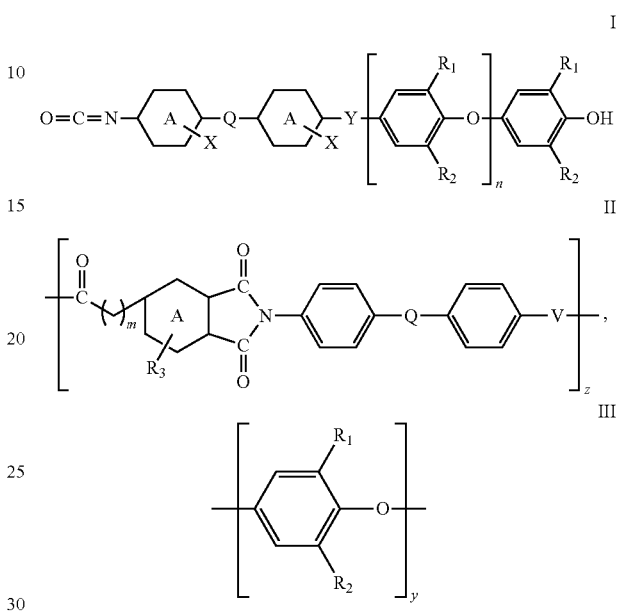

wherein A is phenyl or cyclohexyl;
X is —H, —CH$_3$, —NCO, or —CH$_2$—NCO;
Y is —NH—, —NHCO—, or —NHCOO—;
Q is —CH$_2$—, —C(CH$_3$)$_2$—, —O—, —S—, —SO$_2$—, or absent;
n is an integer of 20-230;
R$_3$ is —H, —CH$_3$, or —COOH;
R$_1$ and R$_2$, independently, are C$_1$-C$_5$ alkyl;
m is an integer of 0-8;
y is an integer of 20-230;
z is an integer of 1-20000; and
V is —NH—, —NHCO—, or —NHCOO—.

* * * * *